3,462,119
TUBING VALVE AND METHOD OF MANUFACTURE

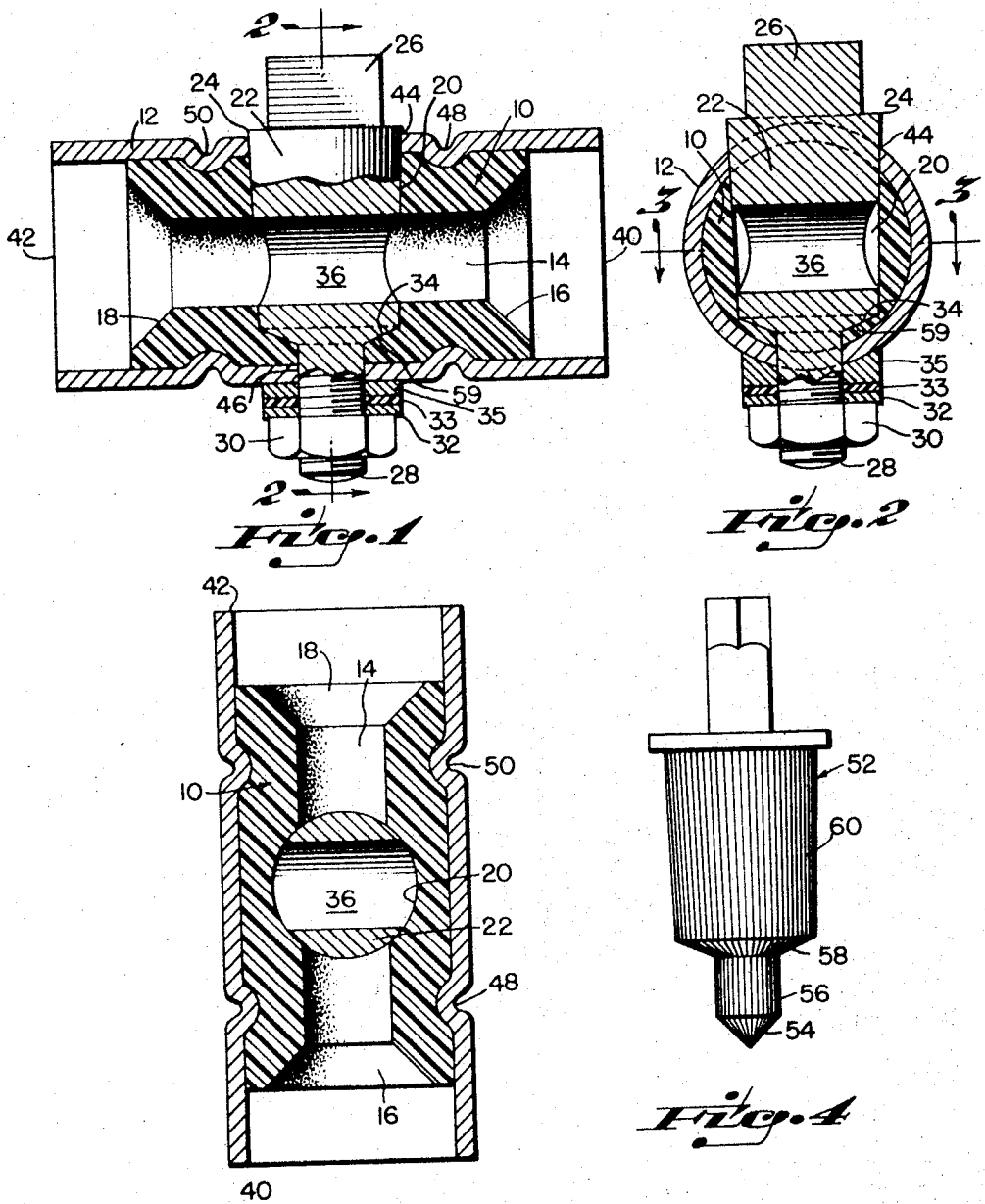

Russell G. Smith, Cincinnati, Ohio, assignor to Continental Manufacturing Company, Cincinnati, Ohio, a corporation of Ohio
Filed Feb. 23, 1966, Ser. No. 529,474
Int. Cl. F16k 5/04, 15/18
U.S. Cl. 251—309     9 Claims

ABSTRACT OF THE DISCLOSURE

The invention involves a plug valve assembly and the method of producing the same which comprises driving a tightly-fitting axially bored cylindrical valve body of pliable plastic material into the open end of a tube, drilling through said tube and body a diametral hole to provide a valve plug chamber with a frusto-conical seat about said bottom hole inserting a transversely ported rotatable valve plug through one end of the diametral hole into the valve chamber and onto the valve seat therein, and then securing the plug against the seat for rotatable movement.

---

The present invention relates to a tubing valve and method of manufacture. The valve is one especially adapted for incorporation in a system to convey a fluid by means of thin walled tubing formed of copper, stainless steel, or the like.

An object of the invention is to facilitate and expedite incorporating a plug valve or shut-off valve in a fluid line of tubing, such as copper or stainless steel tubing, wherein connections generally are made by means of solder joints, or welding.

Another object of the invention is to produce a low-cost, highly serviceable valve, largely of non-metallic construction, which may be effectively installed in a tube system with a minimum expenditure of time, labor, and expense.

Another object is to provide a simple and inexpensive valve of the character stated which effectively resists corrosion, and thereby eliminates the difficulties usually attending corrosion of a valve.

A further object of the invention is to provide a valve having the advantages stated, and which incorporates structure especially effective for ensuring against leakage of fluid controlled thereby.

The foregoing and other objects are attained by the means described herein and illustrated upon the accompanying drawing, in which:

FIG. 1 is a vertical cross-section of the improved valve, shown in open position, and incorporated in a section of tubing.

FIG. 2 is a cross-section taken on line 2—2 of FIG. 1 and showing the valve in closed position.

FIG. 3 is a cross-section taken on line 3—3 of FIG. 2.

FIG. 4 is a view of a cutter or reamer.

The valve as disclosed by the drawing comprises an elongate cylindrical valve body 10, molded or otherwise formed of a pliable resilient plastic material, for example Teflon, and dimensioned to fit snugly within a section of standard, thin-walled tubing 12, such as may be used for conveying a liquid or a gas. The tubing 12 may be formed of hard or soft copper, or of stainless steel or the like, having usually a diameter of about one-half inch or larger, and is usually connected to various types of fittings or appliances by means of solder joints or equivalent connections. Although tubing of copper and stainless steel is presently in very general use, the instant invention contemplates also the use of tubing formed of other materials, for example brass, aluminum, and various alloys, as well as tubing formed of various plastic compositions.

The plastic valve body 10 is initially formed as a plain elongate cylinder having an axial bore 14 open at both ends of the body to provide inlet and outlet ports 16 and 18. The ports may be outwardly flared, if desired, as shown upon the drawing. As formed initially, and as inserted into tubing section 12, the cylindrical body is not transversely bored to receive the valve plug 22; instead, such transverse bore is to be formed by drilling or reaming transversely through the tube 12 and body 10, after the body has been inserted and finally located within said tube.

To explain in greater detail, it is noted that the plain cylindrical plastic body 10, bored longitudinally but not transversely, is to be snugly inserted endwise into tube section 10. If desired, the body may be permanently located within the tube section, by swaging or rolling annular depressions 48 and 50 into the material of the tube section, for displacement into the pliable plastic material of valve body 10. In this manner, valve body 10 may be securely fixed relative to tube 12, with a leak-proof connection assured. Of course, the body 10 may be fixed within the tube by other appropriate methods within the skill of the mechanic.

After fixation of valve body 10, one or more cutting tools is to be driven transversely through the tube at 44 and into the plastic body 10, for forming the valve plug chamber 20. In the simplest possible form of construction, the cutting tool may bottom within the plastic material of the valve body, after which a simple valve plug may be inserted into the chamber for controlling flow of fluid through bore 14. However, in the preferred construction shown, the valve plug extends completely through the tube to expose a threaded stud 28 receptive of a nut 30, for precluding withdrawal of the valve plug through opening 44.

FIG. 4 illustrates a complex cutter or reamer 52 designed to form the several sections of valve plug chamber 20. This tool may include cutting edges 54 to pilot the tool through the tube and body 10; cutting edges 56 to form a bore 46 in tube 12 and an adjacent portion of body 10; cutting edges 58 to form a conical bottom seat 59 in the body interiorly thereof; and cutting edges 60 to form the principal portion of chamber 20. In practice, the cuttings mentioned may be performed separately with the use of several drilling or reaming tools applied in succession and according to acceptable machining techniques.

In the drawing, the area of maximum diameter of the conical valve plug 22 is indicated at 24, this being near the top of upper end of the plug. Extending beyond the top of the plug is a stem 26, by means of which the plug may be rotated.

Valve plug 22 may carry at its lower end a depending stud 28, which may be externally screw-threaded to receive the nut 30 and with one or more washers as shown. The stud 28 is coaxial with the tapered body of the plug, and is of reduced diameter. The base of the stud terminates at a conical shoulder 34 adapted to engage the annular seat 59 at the bottom of plug chamber 20, to preclude fluid leakage along the stud.

The plug is transversely apertured as at 36, thereby to provide a plug port which may be aligned with the body bore 14 in the open position of the valve, FIG. 1. By rotating the plug a quarter-turn, as in FIG. 3, the valve may be closed.

As an added precaution against leakage of fluid along stud 28, a series of washers may be applied to the stud. Washer 32 may be a metallic washer bearing against a washer 33 of Teflon or the like, the latter being in turn buttoned against a performed metallic washer 35 shaped to conform with the arcuacy of the wall of tube 12. The washer arrangement is to preclude loosening of nut 30 when plug 22 is rotated.

Valve plug 22 may be constructed of any material suitable for the service required. Valve plugs of brass, aluminum, or other metals are generally considered satisfactory, and may be very economically manufactured using automatic machinery. However, such plugs may be formed of non-metallic materials if desired. In any event, a plug of non-ferrous metal may render excellent service, since it will resist corrosion and electrolysis when in contact with the plastic valve body 10.

It should be understood that plug 22 might be retained in the chamber 20 with the use of appropriate means other than the threaded connection involving nut 30. Also, if desired, the plastic body of the valve may be anchored and sealed within tube section 12 using means other than grooves 48, 50.

Once the valve has been assembled into the tubing section, the whole may be considered a valve assembly capable of being coupled at the ends 40 and 42 with other sections of tubing, and secured by customary soldering connections without injury to the plastic valve body.

The valve may be supplied to the purchaser either with or without a tube section such as 12. If no tube section is supplied, the purchaser may easily fashion one from a short section of ordinary tubing. The valve parts 10 and 22 can be furnished in several sizes to fit the several sizes of standard tubing available.

What is claimed is:

1. A plug valve assembly comprising in combination: an elongate section of cylindrical tubing having a standard inside diameter; a valve body formed of an elongate cylinder of pliable plastic, said cylindrical body being dimensioned for snug endwise insertion into the tubing section, the body having an axial bore providing opposed inlet and outlet ports and having also a transverse bore intermediate said ports to provide a valve plug chamber, said chamber having opposite ends open diametrically of the body; a pair of opposed openings in the tubing wall, each of said openings being in register with an open end of the plug chamber; an elongate valve plug axially rotatable in the body chamber and having a plug port for registry with the ports of the valve body, said plug having opposite ends projected through the aforesaid openings of the tubing wall; means on one end of the plug for imparting rotation to the plug, the remaining end of the plug being reduced in diameter to provide an annular shoulder, said cylindrical plastic body having an annular seat at the bottom of the plug chamber receiving said shoulder, and the reduced end providing a threaded stud receiving a clamping nut for limiting axial movement of the plug in one direction.

2. The device as specified in claim, wherein the said shoulder and seat therefor are frusto-conical in shape.

3. The device as specified by claim 1, wherein the inner wall of the chamber and the outer wall of the plug are complementarily tapered.

4. The device as specified by claim 1, wherein the valve body is formed wholly of Teflon.

5. The device as specified by claim 1, wherein the material of the tube is permanently depressed annularly into the pliable material of the valve body at a location adjacent to the plug chamber.

6. The method of producing a plug valve assembly, which comprises: driving into one open end of a tube, a tightly-fitting axially bored cylindrical valve body of pliable plastic material; drilling a diametral hole through the tube and the body to provide a valve plug chamber in the body; then inserting a transversely ported rotatable valve plug into one end of the diametral hole, the port of the plug being disposed into and out of registry with the axial bore of the valve body incident to rotation of the plug.

7. The method as specified by claim 6, wherein is included the step of deforming the tube annular at opposite sides of the diametral hole, to depress a portion of the tube into the pliable material of the inserted body, for effecting a tight seal between the body and the tube.

8. The method as specified by claim 6 wherein the diametral hole constituting the plug chamber is tapered, and the valve plug is tapered complementarily, to limit entry of the plug into the chamber.

9. The method as specified by claim 7, wherein the diametral hole constiuting the plug chamber is tapered, and the valve plug is tapered complementarily, to limit entry of the plug into the chamber; and a securing device is applied to one end of the plug for precluding withdrawal of the plug from the chamber in a direction opposite to the direction of plug entry.

References Cited

UNITED STATES PATENTS

| 178,312 | 6/1876 | Leland | 251—309 X |
| 307,220 | 10/1884 | Peters | 251—309 X |
| 2,825,855 | 3/1958 | Frekko | 29—510 |
| 3,083,725 | 4/1963 | Moen | 251—317 X |

FOREIGN PATENTS

| 958,241 | 9/1949 | France. |
| 1,209,827 | 1/1966 | Germany. |
| 275,427 | 8/1927 | Great Britain. |

OTHER REFERENCES

Kurz-Kasch: Custom-Molded Teflon Parts, Product Engineering, November 1950, p. 33.

M. CAREY NELSON, Primary Examiner

JOHN R. DWELLE, Assistant Examiner

U.S. Cl. X.R.

251—368